United States Patent [19]

Yamamoto et al.

[11] Patent Number: 4,822,122

[45] Date of Patent: Apr. 18, 1989

[54] OPTICAL TRANSMISSION MEDIUM AND PROCESS FOR PRODUCING THE SAME BASED ON VINYLIDENE FLOURIDE POLYMERS AND METHARYLATE POLYMERS

[75] Inventors: Takashi Yamamoto; Yoshihiko Mishina; Masaaki Oda, all of Hiroshima, Japan

[73] Assignee: Mitsubishi Rayon Co., Ltd., Tokyo, Japan

[21] Appl. No.: 873,595

[22] Filed: Jun. 11, 1986

[51] Int. Cl.$^4$ ............... G02B 6/00; G02B 1/00; C08L 51/06; C08L 27/16

[52] U.S. Cl. ............... 350/96.31; 350/96.34; 525/199; 525/276

[58] Field of Search ............... 525/199, 276; 350/96.31, 96.34

[56] References Cited

U.S. PATENT DOCUMENTS

| | | | |
|---|---|---|---|
| 3,253,060 | 5/1966 | Koblitz et al. | 525/199 |
| 3,790,645 | 2/1974 | Murayama et al. | 525/199 |
| 4,091,055 | 5/1978 | Kidoh et al. | 525/199 |
| 4,308,359 | 12/1981 | Büning | 525/276 |
| 4,382,358 | 5/1983 | Tappe et al. | 525/72 |
| 4,606,144 | 8/1986 | Sasaki et al. | 525/199 |
| 4,731,417 | 3/1988 | Miyata et al. | 525/199 |
| 4,758,067 | 7/1988 | Sakagami et al. | 350/96.34 |
| 4,775,590 | 7/1988 | Tatsukami et al. | 350/96.34 |

FOREIGN PATENT DOCUMENTS

| | | | |
|---|---|---|---|
| 56-163140 | 12/1981 | Japan | 525/276 |
| 60-004827A | 4/1985 | Japan | 525/199 |
| 60-177064A | 9/1985 | Japan | 525/199 |

*Primary Examiner*—Carman J. Seccuro
*Attorney, Agent, or Firm*—Cushman, Darby & Cushman

[57] ABSTRACT

The graded-index optical transmission medium with a low transmission loss, a favorable index distribution and superior in softness etc. can be constituted by a mixture of polymers Pn having different refractive indices and by restricting the attenuation $L_F$ of the medium in accordance with the below inequality (I).

The medium may advantageously be produced by way of admixing a thermoplastic polymer (A) and a monomer (B) able to form a polymer mutually soluble with the polymer (A), molding the mixture and volatilizing the monomer (B) from the surface of thus shaped substance.

$$L_F < \sum_{n=1}^{N} W_n \cdot L_n \qquad (I)$$

wherein $W_n$ are the respective proportions by weight of mixing of the polymers Pn to the whole of the mixture of the polymers Pn, and $$\sum_{n=1}^{N} W_n$$

is equal to one.

3 Claims, 2 Drawing Sheets

OPTICAL TRANSMISSION MEDIUM AND PROCESS FOR PRODUCING THE SAME BASED ON VINYLIDENE FLOURIDE POLYMERS AND METHARYLATE POLYMERS

FIELD OF THE INVENTION

The present invention relates to an improved graded-index optical transmission medium used for graded-index fibers (e.g. near parabolic fibers), converging lenses, photosensors and the like.

BACKGROUND OF THE INVENTION

Heretofore, there have been reported many graded-index mediums made of glass such as described in the Japanese Patent Publication No. 47-816/1972. The glass mediums, however, have unfortunately been manufactured with low productivity, high cost, and are commonly weak when bent during practical uses.

In addition to the glass mediums, several plastic graded-index mediums have been proposed. In particular, the synthetic resin optical transmission medium described in the Japanese Patent Publication No. 47-28059/1972 uses rather simple methods for forming index distribution, and is quite available for manufacturing. That is to say, the transmission medium as described in the Japanese Patent Publication No. 47-28059/1972 is provided an index distribution through the steps comprising admixing two or more polymers having different refractive indices and different solubilities with respect to the specific solvent when compared to each other, molding the thus obtained mixture to form a rod or fiber, and dipping thus obtained rod or fiber in said specific solvent to elute a portion of the polymers in a different proportion from the proportion of mixing of the polymers. The thus produced graded-index medium, however, has several drawbacks as follows.

(i) In general, the mixture prepared by direct blending of polymers having different refractive indices has an unsteady index distribution and has a transparency lower than the respective polymers. Therefore, such a mixture of polymers can only be used in an extremely short light path medium such as in a lens, but cannot be used in a long light path medium such as in a optical fiber, because of much light scattering along the long path.

(ii) The respective polymers are required to be transparent and must be selected from a small extent of materials, so that it is difficult to find out an adequate combination of polymers to obtain low transmission loss mediums.

(iii) In many cases, the transparent polymers are amorphous with poor mechanical properties. Therefore, the substance obtained by the polymer blend has little practical value in manufacturing fibrous mediums such as optical fibers required to have good properties when bent action as well as adequate softness.

SUMMARY OF THE INVENTION

It is an object of the present invention to provide an optical transmission medium with a low transmission loss, a favorable index distribution, and superior in properties against bending action, softness and processability.

It is another object of the present invention to provide a process for producing the optical transmission medium having good properties as mentioned above, the process being suitable for mass production in which the optical transmission medium can be produced through a continuous operation.

The present invention in a first aspect resides in an optical transmission medium comprising a mixture of the number of N of polymers Pn, in which N is two or more, n=1, 2 ... N, the polymers having different refractive indices from each other, the proportions of mixing of the polymers Pn varying in the optical transmission medium from the interior toward the surface thereof so that the index distribution of the optical transmission medium is formed, and the relationship between the attenuations Ln (dB/m) of the polymers Pn and the attenuation $L_F$ (dB/m) of the optical transmission medium being represented by the following Inequality (I):

$$L_F < \sum_{n=1}^{N} Wn \cdot Ln \qquad (I)$$

wherein Wn are the respective proportions by weight of mixing of the polymers Pn to the whole of the mixture of the polymers Pn, and $$\sum_{n=1}^{N}$$

Wn is equal to one.

The present invention in a second aspect resides in a process for producing an optical transmission medium, comprising admixing and dissolving at least one thermoplastic polymer (A) and a monomer (B) or a mixture of two or more monomers including the monomer (B), the monomer (B) being able to form a polymer mutually soluble with the polymer (A) and has a different refractive index from the polymer (A), molding thus prepared mixture, volatilize the monomer (B) from the surface of thus shaped substance so as to form a continuous distribution of the concentration of the monomer (B) therein from the interior toward the surface of said substance, and polymerizing unpolymerized monomers at the same time with or after the volatilization of the monomer (B).

DETAILED DESCRIPTION OF THE INVENTION

Figure 1:
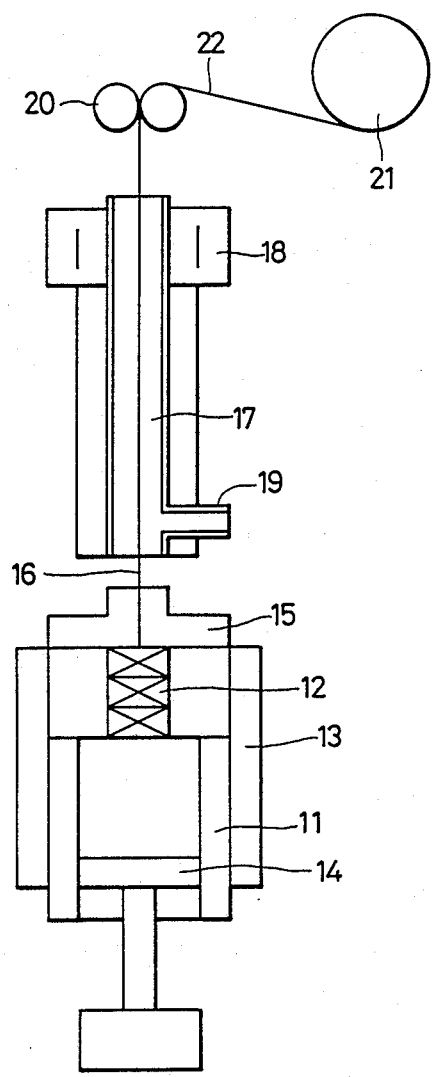
FIG. 1 shows an outline of the apparatus used for producing the optical transmission medium of the present invention.

With regard to the optical transmission medium in accordance with the present invention, the attenuation means a scale of the transparency of macromolecules described in, for example, page 264 of "Testing Method and Evaluation of Macromolecular Materials" edited by the Society of Polymer Science, Japan, published by Baifukan Co., Ltd. (1981). When a light having an input intensity of $I_o$ is put in a transparent body having a length of l (m) and a light having an output intensity of I goes out therefrom, the attenuation L is expressed by the following formula:

$$L = -(10/l) \log (I/I_o)(dB/m)$$

The relationship between the attenuation L and the absorbance A can be expressed by the equation:

$$A = (l/10) \cdot L$$

Said inequality (I) in connection with the optical transmission medium of the present invention may be expressed in a qualitative manner by the statement that no arithmetic mean rule comes into existence between Ln and $L_F$, i.e. between the transparencies of the respective polymers Pn and the transparency of the optical transmission medium. The transparency of the optical transmission medium has to be improved through the preparation of the mixture.

According to the above-mentioned prior art graded-index mediums, improvement in transparency by polymer blending cannot occur; rather it may be considered that the transparency is lowered. In the prior art, however, since a lens having a very short light path has been its objective, reduction in transparency by polymer blending has been neglected. Whereas, in the case where the light transmitting path is elongated as in the case of optical fiber, even a slight reduction in transparency due to polymer blending is not permitted; rather, polymer blending should improve the transparency i.e. the attenuation. Thus the superiority of the optical transmission medium of the present invention can clearly be seen when the medium is used in an elongated transmission path.

In order to produce the optical transmission medium which satisfies said inequality (I), it is necessary to choose the polymers Pn mutually soluble with each other. It is especially preferred to select the combination of materials which can accomplish mutual dissolution in the degree of molecular dispersion.

When the optical transmission medium of the present invention satisfies said inequality (I), it is not necessary at all to restrict the polymers Pn to transparent ones. If fine performances can be given in mechanical properties, heat resistance, solvent resistance, etc. of the medium, opaque crystalline polymers are preferably used.

That is to say, at least one of the number of N of polymers Pn may be an opaque or crystalline polymer which may have an attenuation of 100 dB/m or more. Even when the attenuation of the polymer Pn surpasses 100 dB/m, an optical transmission medium can be obtained having a preferable attenuation of 30 dB/m or less (more preferably 10 dB/m or less). In this case, the uniqueness of the merit of the present invention become clearer.

In the present invention, there are no restrictions on the types of the materials to be used as the polymers Pn, the polymer (A), the monomer (B) and the like. The materials may be selected from known polymers or monomers.

Representative examples of the polymers Pn having an attenuation of 100 dB/m or more to be advantageously used in the present invention include polyvinylidene fluoride and a copolymer containing as a chief monomeric unit vinylidene fluoride. Illustrative examples of such a copolymer include copolymers of vinylidene fluoride with fluorine-containing vinyl compounds such as tetrafluoroethylene, trifluoroethylene, hexafluoropropylene, vinyl fluoride, chlorotrifluoroethylene, perfluoroalkylvinyl ether, hexafluoroacetone, etc., methacrylic acid esters such as methyl methacrylate, butyl methacrylate, etc., vinyl acetate, etc. However, the comonomers are not limited to these examples.

Among these copolymers, those which are most excellent in practical properties such as heat resistance, mechanical characteristics, processability, refractive index balance, etc. are copolymers of vinylidene fluoride with tetrafluoroethylene, trifluoroethylene or hexafluoroacetone. The amount of vinylidene fluoride units in the copolymer thereof with tetrafluoroethylene is preferred to be 60-95% by mole. The amount of vinylidene fluoride in the copolymer thereof with trifluoroethylene is preferred to be at least 20% by mole. The amount of vinylidene fluoride in the copolymer thereof with hexafluoroacetone is preferred to be at least 50% by mole. Among these copolymers, the copolymer of vinylidene fluoride and tetrafluoroethylene is especially preferred, for the reason of its superior processability and heat resistance.

When polyvinylidene fluoride or the copolymer containing as a chief monomeric unit vinylidene fluoride or, in particular, the copolymer comprising 60-95% by mole of vinylidene fluoride unit and 40-5% by mole of tetrafluoroethylene is used as at least one of the polymers Pn which has an attenuation of 100 dB/m or more in the present invention, it is preferred to use a polymer or polymers having an attenuation of 30 dB/m or less in combination therewith. Preferable examples of such a low attenuation polymer include polymethyl methacrylate and a copolymer containing as a chief monomeric unit methyl methacrylate. Examples of comonomers in such copolymers containing as a chief monomeric unit methyl methacrylate include methacrylates such as ethyl methacrylate, propyl methacrylate, n-butyl methacrylate, t-butyl methacrylate, cyclohexyl methacrylate, phenyl methacrylate, benzyl methacrylate, 2,2,2-trifluoroethyl methacrylate, 2,2,3,3,3-pentafluoropropyl methacrylate, perfluoro-tert-butyl methacrylate, 1,1,1,3,3,3-hexafluoro-isobutyl methacrylate, β-hydroxyethyl methacrylate, glycidyl methacrylate, β-methylglycidyl methacrylate, etc., acrylates such as methyl acrylate, ethyl acrylate, propyl acrylate, butyl acrylate, etc., methacrylic acid, acrylic acid, styrene, α-methylstyrene, etc. However, the comonomers are not limited to these examples. The copolymers may be those which further contain a small quantity of another kind of comonomer such as acrylonitrile, maleic anhydride, etc.

The quantity of such comonomers other than methyl methacrylate is desired to be 50% by weight or less, preferably 30% by weight or less, more preferably 15% by weight or less based on the weight of the copolymer.

Besides, polyethyl methacrylate, polymethyl acrylate, polyvinyl methyl ketone, etc. are also preferred.

Since the mixture of the polymer $P_1$ comprising polyvinylidene fluoride or a copolymer comprising as a chief monomeric unit vinylidene fluoride and the polymer $P_2$ comprising polymethyl methacrylate or a copolymer comprising as a chief monomeric unit methyl methacrylate, has a superior mutual solubility, molecular dispersion is almost achieved, and in spite of the fact that polymers having considerably different refractive indexes are mixed, the resulting mixture is transparent in a mixing proportion within a considerably broad range.

The range of the proportion of mixing in which transparency is achieved is 0-80% by weight, preferably 0-70% by weight of the polymer $P_1$ based on the weight of the mixture. If the quantity of the polymer $P_1$ exceeds 80% by weight, the vinylidene fluoride polymer readily crystallizes and becomes undesirably milk-white in color or opaque.

The composition constitutes, in accordance with the present invention, the optical transmission medium in which the content of the polymer $P_1$ as a chief component in the mixture of the polymers $P_1$ and $P_2$ changes from the interior to the surface of the medium in the range of 0 to 80% by weight, preferably, 0 to 70% by weight, and the refractive index also changes accordingly.

In the above-mentioned copolymer containing as a chief monomeric unit methyl methacrylate, cross-linked polymers which can prevent the vinylidene fluoride polymers from crystallization at the heat treatment thereof may preferably be used.

The cross-linked polymers containing as a chief monomeric unit methyl methacrylate usable as the polymer Pn may be prepared by various known polymerization methods, for example, a method in which methyl methacrylate is copolymerized or graft polymerized with a crosslinking monomer having two or more functional groups selected from vinyl group, acryloyl group, methacryloyl group and the like (e.g. glycol dimethacrylate, diethyleneglycol dimethacrylate, methalyl methacrylate, trimethylolpropane trimethacrylate, divinyl benzene); a method in which methyl methacrylate is copolymerized with a crosslinking monomer having a group active in a crosslinking reaction such as unsaturated polyester (metha)acrylate, epoxy (metha)acrylate, urethane (metha)acrylate, polyol (metha)acrylate; a method in which a crosslinking reaction is carried out by use of a radiation, electron beam, etc.

When methyl methacrylate is subjected to crosslinking reaction, comonomers other than crosslinking monomers may be used for the purpose of improving various properties such as heat resistance, mechanical properties of the optical transmission medium. Illustrative examples of such comonomers include methacrylates such as ethyl methacrylate, propyl methacrylate, n-butyl methacrylate, tert-butyl methacrylate, cyclohexyl methacrylate, phenyl methacrylate, benzyl methacrylate, 2,2,2-trifluoroethyl methacrylate, 2,2,3,3,3-pentafluoropropyl methacrylate, perfluoro-tert-butyl methacrylate, 1,1,1,3,3,3-hexafluoroisopropyl methacrylate, $\beta$-hydroxyethyl methacrylate, glycidyl methacrylate, $\beta$-methylglycidyl methacrylate, acrylates such as methyl acrylate, ethyl acrylate, propyl acrylate, butyl acrylate, methacrylic acid, acrylic acid, styrene, $\alpha$-methylstyrene. However, the comonomers are not limited to these examples, but the copolymers may be those which further contain a small quantity of another kind of comonomer such as acrylonitrile, maleic anhydride, etc.

The amount by weight of the crosslinking monomer or comonomer to be polymerized with methyl methacrylate should be equal to or less than that of methyl methacrylate. If not so, the resulting polymer will have bad mutual solubility with the vinylidene fluoride polymer.

In the case where the optical transmission medium is formed in the shape of a fiber or rod, when the distance from the central axis of the fiber or rod toward the radius direction is r the refractive index of the fiber or rod at its central axis is $n_0$; the refractive index of the fiber or rod at the part of r is n; and the positive constant is $\alpha$, then the case where the index distribution corresponds nearly to the following equation is particularly preferred:

$$n = n_0(1 - \alpha r^2) \tag{3}$$

In this case, the light flux put in the medium advances without being reflected on the medium surface and thus makes it possible to reduce the deviation of the phase velocity of the light flux, the spreading of the light flux and the reflection loss of light.

Further, as to the fibrous optical transmission medium of the index distribution type of the present invention nearly satisfying the equation (3), the degree of variability of the average diameter of the fiber is preferably within 2% or less, preferably 1% or less.

When the optical transmission medium of the index distribution type of the present invention is a mixture of polymers which are mutually soluble with one another, the polymers are completely soluble with one another at about room temperature, depending on the combination of the polymers so that the attenuation is small, but when the mixture is heated to its spinodal decomposition temperature or higher, at some point, phase separation occurs to increase the attenuation. In such a case, the optical transmission medium is useful as a light sensor for temperature detection.

Next, a preferable example of a process for producing the optical transmission medium of the present invention will be described.

A mixture obtained by mixing and dissolving the polymer having a lower refractive index and a monomer for forming the polymer having a higher refractive index among the polymers Pn used in the present invention is extruded from a nozzle, followed by the monomers to afford a concentration distribution of the monomers therein from the interior toward the surface, and at the same time therewith or thereafter polymerizing the unpolymerized monomers, whereby it is possible to obtain the optical transmission medium of the present invention.

Since an extremely high transparency is required for the optical transmission medium of the present invention, it is difficult to attain such a transparency according to the process of the above prior art (Japanese Patent Publication No. 47-28059/1972) wherein polymers are mixed with one another; thus it is possible to attain the object of the present invention by completely and uniformly dissolving polymers in different monomers, followed by polymerizing the monomers.

According to this production process, no chemical bonding occurs between polymers or between polymers and different monomers, in the mixing step, the volatilization step or the polymerization step.

Further, a preferable example of a process for producing the optical transmission medium of the present invention will be described in more detail referring to an example wherein vinylidene fluoride-tetrafluoroethylene copolymer and polymethyl methacrylate are used. Further, an example of the apparatus for producing the optical transmission medium of the present invention will be illustrated in FIG. 1 as an outline.

A mixture of vinylidene-tetrafluoroethylene copolymer, polymethyl methacrylate and methyl methacrylate monomer is fed into a cylinder 1, followed by pushing it out quantitatively by means of a piston 4 while heating it by means of a heater 3, blending the mixture homogeneously at a kneading apparatus 2, and extruding the mixture from a nozzle 5 to obtain a strand fiber 6, leading this strand fiber 6 to a volatilization apparatus 7 where methyl methacrylate monomer is volatilized from the surface of the fiber by means of an inert gas such as air, $N_2$, Ar, etc. introduced through a gas-introducing port 9, to yield a distribution of the concentration of methyl methacrylate inside the fiber. This concentration distribution is controlled by the thickness of the strand fiber, extruded quantity, take-up rate of the fiber, staying time in the volatilization apparatus, temperature at volatilization, flow quantity of gases, etc. in accordance with the object, followed by leading the resulting fiber to an active light-irradiating apparatus 8 to polymerize the remaining monomer and solidifying, and taking up on a take-up drum 11 via nip rolls 10 continuously obtain the object optical transmission medium 12. In addition, the time at which the light irradiation is carried out in the present invention may be after volatilization, but volatilization and light-irradiation may be carried out at the same time. Further, the volatilization may be carried out in a flow of an inert gas such as air, $N_2$, Ar, etc., and may also be carried out under reduced pressure. Moreover, in order to further reduce the quantity of the remaining monomer in the optical transmission medium 12, a heat polymerization apparatus may be provided after the light-irradiating apparatus, or a process of further carrying out the light irradiation under heating to the glass transition point (Tg) of the polymer or higher is also preferred.

In particular a process of carrying out spinning in an upwards direction and pulling up the fiber vertically is preferred in that strand unevenness of the fiber is reduced and the controlling width of the volatilization conditions is broadened.

Further it is effective to add known photo-initiator, promotor or sensitizer for promoting photo-polymerization to the above mixture as the raw material and simultaneously use these.

The above mixture becomes translucent or milk-white at low temperatures since vinylidene fluoridetetrafluoroethylene copolymer crystallizes; hence the storage temperature of the mixture is preferably 30° C. or higher, more preferably 60° C. or higher.

Similarly, the temperature the volatilizing is also preferred to be high, that is, preferred to be in the range of 40° to 110° C. At temperatures lower than 40° C., vinylidene fluoride copolymers sometimes crystallizes during volatilization and the attenuation increases. At temperatures exceeding 110° C., methyl methacrylate bubbles; hence such high temperatures are also undesirable.

In order to enhance the storage stability of the above mixture and also in order to prevent the viscosity change i.e. the thermal polymerization at the time of molding the mixture into the form of fiber or the like, it is preferred to use a known polymerization inhibitor.

The thus prepared mixture causes no thermal polymerization at temperatures of about 100° C., but in order to obtain a homogeneous optical transmission medium, it is necessary to knead the mixture sufficiently homogeneously.

In the kneading operation, it is possible to employ a known kneading apparatus. Further, in order to obtain an optical transmission medium having a diameter of about 0.1 to 5 mm, the viscosity of the mixture at its extrusion temperature is particularly important, and is preferred to be in the viscosity range of 1,000 to 100,000 poises, preferably 5,000 to 50,000 poises.

The viscosity adjustment may also be carried out by adjusting the molecular weight of polymethyl methacrylate, besides the concentration adjustment. Particularly those having an intrinsic viscosity [$\eta$] of 0.5 to 3.0 g/dl (as measured in methylethyl ketone at 25° C.) are preferred in that the viscosity adjustment is not only easily carried out, but also the storage stability and stringiness of the mixture are superior.

The active light source 8 capable of being used in the present process, may be a carbon-arc lamp, ultra-high pressure mercury lamp, high pressure mercury arc lamp, low pressure mercury arc lamp, chemical lamp, xenon lamp, laser rays, etc. emitting a light having a wavelength of 150 to 600 nm. Further, in some cases, it does not matter if polymerization is carried out by irradiation of electron rays. Further, in order to complete the polymerization, or in order to make the quantity of the remaining monomer as small as possible, it is effective to carry out the photo-irradiation in two stages or the irradiation together with thermal polymerization. In succession to the polymerization, the remaining monomer may be removed by drying with hot air, etc.

The quantity of the remaining monomer in the optical transmission medium of the present invention is preferred to be as small as possible, 5% by weight or less, preferably 3% by weight or less, more preferably 1.5% by weight or less. This can be achieved according to the above processes.

The optical transmission medium in accordance with the present invention has different uses such as mediums for transmitting light signals, components of a photosensor, arrays of lenses used in a photocopier or facsimile apparatus, couplers of optical fibers, rod lenses used in light-splitting devices and line sensors.

The process in accordance with the present invention is very simple, efficient and achieves high productivity.

The present invention will be described in more detail by the following Examples and Comparative Examples, in which parts means parts by weight.

Evaluations of various properties were carried out according to the following methods:

I. MEASUREMENT OF ATTENUATION

A He-Ne laser light flux having a wavelength of 633 nm was put in the surface of one end of a fiber or rod having both surfaces thereof vertically polished and arranged in a straight manner and having a length of $l_1$ (m), and put out of the surface of the other end thereof to read the light output $I_1$ by means of a photodiode. Next, the fiber or rod was cut in a short length, leaving the input end surface behind, which was then polished. The resulting length was labeled $l_2$ (m). In the same manner as above, the resulting light output $I_2$ was read. The attenuation L was calculated according to the following equation:

$$L = \frac{10}{l_1 - l_2} \log \frac{I_2}{I_1} \text{ (dB/m)}.$$

II. MEASUREMENT OF LENS PROPERTIES (1) Apparatus for Measurement

Figure 2:
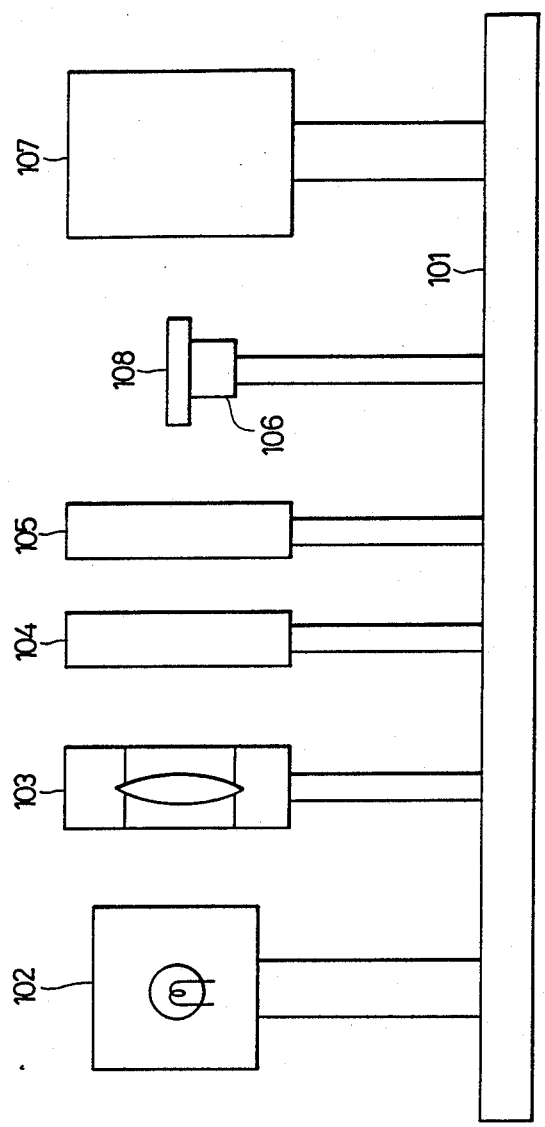
FIG. 2 shows a schematic view of the apparatus for evaluating lens properties of the optical transmission medium of the present invention.

FIG. 2 shows the apparatus as used for measuring lens properties. In FIG. 2, 101 is an optical bench, 102 is a tungsten lamp used as a light source, 103 is a light converging lens, 104 is a stop, 105 is a glass plate on which a square lattice of 0.1 mm interval is formed by the fine processing of the chrome layer of the chrome plated glass, 106 is a sample holder, 107 is a Polaroid camera, and 108 is a sample subject to the evaluation.

(2) Preparation of Samples

The graded-index lens as prepared was cut into a length of one fourth of the period of the ray as measured based on undulation of He-Ne laser rays passing therethrough and polished at the end faces by a grinder so as to obtain flat faces parallel to each other and perpendicular to the major axis.

(3) Method of Measurement

As seen from FIG. 2, the sample 108 as prepared was set on the sample holder 106. After the stop 104 was adjusted so as to let the light from the source 101 pass through lens 103, stop 104 and the glass plate 105 and enter the whole face of the sample, the positions of the sample 109 and Polaroid camera 107 were adjusted so as to focus the light on the Polaroid camera. As a result, the square lattice image was obtained and the distortion thereof was observed.

III. MEASUREMENT OF INDEX DISTRIBUTION

The index distribution was measured by known method using an Interfaco interference microscope manufactured by Carl Zeiss.

IV. MEASUREMENT OF DEGREE OF VARIABILITY OF AVERAGE

Diameter

The diameter of the sample was measured in the length of 10 m by use of Non-Contact Laser Fiber Diameter Measuring Apparatus M-551B manufactured by Anritsu Co., Ltd. The degree of variability of average diameter $V_D$ was calculated based on thus measured diameters and according to the following equation:

$$V_D = \frac{\text{(maximum diameter)} - \text{(minimum diameter)}}{\text{(average diameter)}} \times 100$$

V. EVALUATION OF SOFTNESS

Softness was evaluated by the number of times of breaking of fiber out of three times testing in the midst of the ten round windings around the mandrel having a diameter five times as large as that of the fiber. The evaluation was shown by the following marks.

|   | Number of Times of Breaking | Softness |
|---|---|---|
| ○ | 0 | very good |
| ○ | 1 | good |
| △ | 2 | bad |
| x | 3 | very bad |

EXAMPLE 1

In cylinder 1 of the apparatus as shown in FIG. 1 a mixture was fed comprising 20 parts of the copolymer comprising 80% by mole of vinylidene fluoride and 20% by mole of tetrafluoroethylene and having an attenuation of 200 dB/m and a crystalline melting point of 130° C. as measured by differential thermal analysis (refractive index $n_D$=1.400), 30 parts of polymethyl methacrylate having an attenuation of 1 dB/m and an intrinsic viscosity [$\eta$] of 2.5 dl/g as measured in methylethyl ketone at 25° C. (refractive index $n_D$=1.492), 50 parts of methyl methacrylate monomer, 0.1 part by weight of 1-hydroxycyclohexyl phenyl ketone and 0.1 part by weight of hydroquinone. The thus placed mixture was heated at 80° C., passed through a kneader and extruded from a nozzle having a diameter of 2.0 mm.

The viscosity of the mixture was $1 \times 10^4$ poise at the extrusion thereof. The thus extruded fiber was then passed over thirteen minutes through the volatilization part heated at 80° C. and in which nitrogen gas was passed at the rate of 10 l/min and subsequently passed through the interior of cylindrically arranged six pieces of 500 W high-pressure mercury lamps so as to irradiate the light over 0.5 minute followed by pulling up by nip rollers at the rate of 20 cm/min.

The average diameter of the thus obtained fiber was 1000 μm (max. 1003 μm, min. 997 μm). The index distribution as measured by Interfaco interference microscope includes the index of 1.466 at the central axis and the index of 1.460 at the periphery of the fiber. The refractive index was continuously lowered from the central axis toward the periphery of the fiber. The positive constant α of the above-mentioned equation (3) was 0.0164.

The NMR analysis taught the distribution of the concentration of the copolymer of vinylidene fluoride and tetrafluoroethylene. The content of said copolymer was varied in the range of from 26.4% by weight (at the central axis of the fiber) to 33.2% by weight (at the periphery of the fiber), and was 29.8% by weight on an average. The content of the residual methyl methacrylate monomer was 1.0% by weight in the whole of the fiber.

As a result of the above-mentioned measurement of lens properties, the fiber showed little distortion of the square lattice image.

The attenuation as measured of the fiber was 8.0 dB/m which was much less than the total of the attenuations of the respective polymers Pn $$\left( \sum_{n=1}^{N} W_n \cdot L_n \right),$$

which was 60.3 dB/m.

The transparency of the fiber (cut into a 10 cm length rod) was compared with 10 cm rods of a copolymer of vinylidene fluoride and polymethyl methacrylate. As a result of the visual observation, the rods of the fiber of the present invention and polymethyl methacrylate were transparent, but the rod of said copolymer was white and opaque.

Moreover, the fiber exhibited good softness as shown in the below Table 1 in the above-mentioned evaluation.

The transmission loss of the fiber obtained was measured in accordance with the method as described in the Japanese Patent Application Open-Laid No. 58-7602/1983 and using the light source of red LED having the central wavelength of 660 nm (produced by Stanley Electric: EBR-5507S). As a result, the transmission loss as measured was 6.8 dB/m. Thus, it was ascertained that the fiber can be used for transmission of light signals within the range of 10 m or less.

EXAMPLES 2 THROUGH 6

Comparative Examples 1 and 2

The graded-index fibers were prepared in the same manner as in Example 1, with the exception that the amounts of the vinylidene fluoride copolymer, polymethylmethacrylate and methyl methacrylate were changed as shown in Table 1. The results of the above-mentioned evaluations were shown in Table 1.

TABLE 1

| | CVF (wt %) | PMMA (wt %) | MMA (wt %) | Constant $\alpha$ | Average Proportion of CVF | $L_F$ (dB/m) | $\sum_{n=1}^{N} W_n \cdot L_n$ (dB/m) | Softness | Degree of Variability of Diameter (%) |
|---|---|---|---|---|---|---|---|---|---|
| Example 1 | 20 | 30 | 50 | 0.0164 | 0.30 | 8.0 | 60.3 | ○ | 0.6 |
| Example 2 | 30 | 20 | 50 | 0.0171 | 0.48 | 10.0 | 95.8 | ○ | 0.5 |
| Example 3 | 40 | 10 | 50 | 0.0294 | 0.66 | 23 | 132.6 | ○ | 0.5 |
| Comparative Example 1 | 50 | 0 | 50 | 0.0394 | 0.86 | 40 | 172.0 | ○ | 0.6 |
| Example 4 | 20 | 10 | 70 | 0.0358 | 0.54 | 10 | 109.2 | ○ | 1.3 |
| Example 5 | 20 | 50 | 30 | 0.0055 | 0.24 | 7 | 48.9 | ○ | 0.4 |
| Example 6 | 5 | 45 | 50 | 0.0027 | 0.08 | 5 | 17.0 | x | 0.4 |
| Comparative Example 2 | 60 | 0 | 40 | 0.0296 | 0.86 | 45 | 172 | ○ | 0.9 |

CVF: the vinylidene fluoride copolymer,
PMMA: polymethyl methacrylate,
MMA: methyl methacrylate.

EXAMPLES 7 THROUGH 10

Comparative Examples 3 through 5

The graded-index fibers were prepared in the same manner as in Example 2, with the exception that the intrinsic viscosity [η] of polymethyl methacrylate and the temperature of the volatilization part were changed as shown in Table 2. The results of the above-mentioned evaluations were shown in Table 2.

TABLE 2

| | Viscosity [η] of PMMA (At 25° C. In Methyl) | Temperature of Volatilization Part (°C.) | Constant $\alpha$ | Average Proportion of CVF | $L_F$ (dB/m) | $\sum_{n=1}^{N} W_n \cdot L_n$ (dB/m) | Softness | Degree of Variability of Diameter (%) |
|---|---|---|---|---|---|---|---|---|
| Example 2 | 2.5 | 80 | 0.0171 | 0.30 | 10.0 | 60.3 | ○ | 0.5 |
| Example 7 | 2.5 | 100 | 0.0138 | 0.50 | 7.0 | 100 | ○ | 0.8 |
| Example 8 | 2.5 | 50 | 0.0151 | 0.43 | 18.0 | 85.9 | ○ | 0.6 |
| Comparative Example 3 | 2.5 | 25 | 0.0096 | 0.39 | 45 | 80.2 | ○ | 1.2 |
| Example 9 | 1.0 | 80 | 0.0138 | 0.52 | 20 | 104.7 | ○ | 0.8 |
| Comparative Example 4 | 1.0 | 50 | 0.0069 | 0.48 | 70 | 97 | ○ | 0.7 |
| Example 10 | 0.55 | 80 | 0.0083 | 0.53 | 25 | 107 | ○ | 1.4 |
| Comparative Example 5 | 0.55 | 50 | 0.0083 | 0.52 | 90 | 104 | ○ | 1.5 |

EXAMPLES 11 THROUGH 16

The graded-index fibers were prepared in the same manner as in Example 2, with the exception that the residence time of the fiber in the volatilization apparatus or/and the fiber diameter were changed as shown in Table 3. The results of the above-mentioned evaluations were shown in Table 3.

TABLE 3

| | Staying Time in Volatilization Part (min.) | Fiber Diameter (μm) | Constant $\alpha$ | Average Proportion of CVF | $L_F$ (dB/m) | $\sum_{n=1}^{N} W_n \cdot L_n$ (dB/m) | Softness | Degree of Variability of Diameter (%) |
|---|---|---|---|---|---|---|---|---|
| Example 2 | 13 | 1000 | 0.0171 | 0.30 | 10.0 | 60.3 | ○ | 0.5 |
| Example 11 | 5 | 1000 | 0.0068 | 0.34 | 11 | 67.7 | ○ | 0.9 |
| Example 12 | 20 | 1000 | 0.0083 | 0.52 | 18 | 104.7 | ○ | 0.6 |
| Example 13 | 13 | 1500 | 0.0159 | 0.44 | 12 | 88.8 | ○ | 0.3 |
| Example 14 | 13 | 700 | 0.0197 | 0.50 | 13 | 99.6 | ○ | 0.8 |
| Example 15 | 5 | 500 | 0.0110 | 0.34 | 9.0 | 69.4 | ○ | 0.9 |
| Example 16 | 3 | 300 | 0.0152 | 0.35 | 10 | 70.0 | ○ | 1.0 |

EXAMPLES 17 THROUGH 19

Comparative Examples 6 and 7

The graded-index fibers were prepared in the same manner as in Example 2, with the exception that the content of tetrafluoroethylene in the copolymer as used was changed as shown in Table 4. The results of the above-mentioned evaluations were shown in Table 4.

TABLE 4

| | Content of Tetrafluoro-ethylene | Attenuation of CVF (dB/m) | Results of Evaluation | | | | | |
|---|---|---|---|---|---|---|---|---|
| | | | Constant $\alpha$ | Average Proportion of CVF | $L_F$ (dB/m) | $\sum_{n=1}^{N} W_n \cdot L_n$ (dB/m) | Softness | Degree of Variability of Diameter (%) |
| Example 2 | 20 | 200 | 0.0171 | 0.30 | 10.0 | 60.3 | O | 0.5 |
| Example 17 | 10 | 210 | 0.0179 | 0.46 | 17 | 93 | O | 0.7 |
| Example 18 | 7 | 210 | 0.0192 | 0.45 | 18 | 96 | O | 1.5 |
| Example 19 | 30 | 250 | 0.0180 | 0.47 | 25 | 118 | O | 2.5 |
| Comparative Example 6 | 50 | 300 | 0.0153 | 0.44 | 110 | 150 | O | 5.0 |
| Comparative Example 7 | 3 | 300 | 0.0124 | 0.47 | 60 | 150 | O | 7.0 |

EXAMPLES 20 THROUGH 24

The graded-index fibers were prepared in the same manner as in Example 2, with the exception that the comonomer of vinylidene fluoride or its content was changed as shown in Table 5. The results of the above-mentioned evaluations were shown in Table 5.

TABLE 5

| | Kind and Amount of Monomer | Attenuation of CVF (dB/m) | Results of Evaluation | | | | | |
|---|---|---|---|---|---|---|---|---|
| | | | Constant $\alpha$ | Average Proportion of CVF | $L_F$ (dB/m) | $\sum_{n=1}^{N} W_n \cdot L_n$ (dB/m) | Softness | Degree of Variability of Diameter (%) |
| Example 2 | tetrafluoro-ethylene 20 mol % | 200 | 0.0171 | 0.30 | 10.0 | 60.3 | O | 0.5 |
| Example 20 | trifluoro-ethylene 48 mol % | 200 | 0.0125 | 0.48 | 20 | 96.6 | O | 0.9 |
| Example 21 | hexafluoro acetone 9 mol % | 180 | 0.0138 | 0.46 | 9.0 | 83 | O | 0.8 |
| Example 22 | hexafluoro acetone 25 mol % | 200 | 0.0180 | 0.47 | 11.0 | 95 | O | 1.3 |
| Example 23 | hexafluoro-propylene 15 mol % | 300 | 0.0175 | 0.31 | 25 | 93 | O | 2.3 |
| Example 24 | tetrafluoro-ethylene 20 mol % hexafluoro acetone 5 mol % terpolymer | 150 | 0.0180 | 0.46 | 6.0 | 69 | O | 0.5 |

EXAMPLES 25 THROUGH 27

The graded-index fibers were prepared in the same manner as in Example 2, with the exception that the polymer and monomer as shown in Table 6 (their content in the mixture were also shown in Table 6) were used instead of polymethyl methacrylate and methyl methacrylate.

TABLE 6

| | Polymer | Monomer | Results of Evaluation | | | | | |
|---|---|---|---|---|---|---|---|---|
| | | | Constant $\alpha$ | Mixing Proportion | $L_F$ (dB/m) | $\sum_{n=1}^{N} W_n \cdot L_n$ (dB/m) | Softness | Degree of Variability of Diameter (%) |
| Example 25 | PEMA 20 wt % | EMA 50 wt % | 0.0166 | 0.46 | 13 | 92 | O | 0.8 |
| Example 26 | P(MMA/3FM) (80/20) 20 wt % | MMA 50 wt % | 0.0221 | 0.42 | 19 | 85 | O | 0.7 |
| Example 27 | PMMA 20 wt % | (MMA/3FM) (80/20) 50 wt % | 0.0256 | 0.45 | 15 | 90 | O | 0.9 |

PEMA: polyethyl methacrylate,
P(MMA/3FM): copolymer of 80% by weight of methyl methacrylate and 20% by weight of 2,2,2-trifluoroethyl methacrylate,
MMA/3FM: mixture of 80% by weight of methyl methacrylate and 20% by weight of 2,2,2-trifluoroethyl methacrylate,
Attenuation of PEMA = 1.0 dB/m, of P(MMA/3FM) = 1.2 dB/m.

Comparative Example 8

The mixture of 20 parts of the copolymer of vinylidene fluoride and tetrafluoroethylene as used in Example 1 and 80 parts of polymethyl methacrylate was prepared by plasticizing them at the temperature of 170°–190° C. and kneading them homogeneously by means of a roll. The thus obtained mixture was molded into a shape of a rod having the diameter of 5 mm by means of an extruder. The thus obtained rod was then dipped in a mixture of methylene chloride and acetone so as to elute polymethyl methacrylate in an amount more than that of the copolymer.

After drying, the thus treated white rod was heated at 170° C. at one end thereof and stringed out therefrom to obtain a fiber having a diameter of about 1.0 mm. The refractive index of the thus obtained fiber was in the range of from 1.465 at the periphery to 1.470 at the central axis of the fiber, but the attenuation was 100 dB/m so that the fiber could not be used as the optical transmission medium at all.

Comparative Example 9

In cylinder 1 of the apparatus as shown in FIG. 1 was fed a mixture of 60 parts of the copolymer comprising 80% by weight of methyl methacrylate and 20% by weight of 2,2,2-trifluoroethyl methacrylate and having the attenuation of 2 dB/m, [$\eta$] of 1.2 dl/g ($n_D=1.478$), 40 parts of methyl methacrylate monomer ($n_D=1.492$, the attenuation is equal to 1.0 dB/m when it is monopolymerized), 0.1 part of benzyl methyl kethal and 0.1 part of hydroquinone.

The thus placed mixture was heated at 80° C., passed through a kneader part and extruded from a nozzle having a diameter of 2.0 mm. The thus extruded fiber was then passed for more than eight minutes through the volatilization part in which nitrogen gas heated at 70° C. was flown at the rate of 10 l/min and subsequently passed through the interior of cylindrically arranged six pieces of 500 W high-pressure mercury lamps so as to irradiate the light over about five minutes followed by pulling up by nip rollers at the rate of 20 cm/min.

The average diameter of the thus obtained fiber was 800 μm. The index distribution as measured by Interfaco interference microscope includes the index of 1.484 at the central axis and the index of 1.480 at the periphery of the fiber. The refractive index was continuously lowered from the central axis toward the periphery of the fiber. The rod as prepared by cutting the thus obtained fiber into a 10 mm length and polished so that the end face thereof could work as a convex lens. The content of the residual methyl methacrylate monomer was 1.0% by weight in the whole of the fiber. The 10 cm rod could not be used for the optical transmission for the reason of its great attenuation of 50 dB/m or higher.

Comparative Example 10

In a cylinder 1 of the apparatus as shown in FIG. 1 was fed a mixture of 60parts of the copolymer comprising 70% by weight of styrene and 30% by weight of methyl methacrylate ($n_D=1.56$, the attenuation is equal to 4.5 dB/m), 40 parts of styrene monomer ($n_D=1.59$, the attenuation is equal to 3.0 dB/m when monopolymerized) and light initiator. Thereafter, the optical fiber was prepared in the same manner as in Example 1. As a result, the fiber obtained showed great attenuation of 40 dB/m or higher.

What is claimed:

1. An optical transmission fiber medium comprising: a mixture of polymers resulting in said fiber medium having a distribution of the refractive index n corresponding nearly to the equation, $n=n_0(1-\alpha r^2)$, in which r is a distance from the central axis of the fiber toward the radius direction, $n_0$ is the refractive index at the central axis and $\alpha$ is a positive constant;

said mixture of polymers including the number of N of polymers Pn, in which N is two or more, n=1, 2, ... N, the polymers having different refractive indices from each other, the proportion of mixing of the polymers Pn varying in the optical transmission medium from the interior toward the surface thereof so that the index distribution of the optical transmission medium is formed, and the relationship between the attenuations Ln (dB/m) of the polymers Pn and the attenuation $L_F$ (dB/m) of the optical transmission medium being represented by the following inequality (I):

$$L_F < \sum_{n=1}^{N} Wn \cdot Ln \qquad (I)$$

wherein Wn are the respective proportions by weight of mixing of the polymers Pn to the whole of the mixture of the polymers Pn, and $$\sum_{n=1}^{N}$$

Wn is equal to one; and said polymers Pn including a copolymer having an attenuation of 100 dB/m or more and including 60-95% by mole of vinylidene fluoride unit and 40-5% by mole of tetrafluoroethylene, and a polymer having an attenuation of 30 dB/m or less and selected from the group consisting of polymethyl methacrylate and a copolymer containing methyl methacrylate, as a chief monomeric unit, said mixture of polymers being obtained by polymerising a monomer selected from methyl methacrylate and a monomer mixture containing methyl methacrylate as a chief component in the presence of a mixture of said copolymer of vinylidene fluoride and tetrafluoroethylene and a polymer selected from polymethyl methacrylate and a copolymer containing methyl methacrylate as a chief monomeric unit.

2. The optical transmission fiber medium as claimed in claim 1, wherein at least one of said polymers Pn has an attenuation of 100 dB/m or more (Ln), and wherein said optical transmission fiber medium has an attenuation of 30 dB/m or less ($L_F$).

3. The optical transmission fiber medium as claimed in claim 2, wherein said polymer having an attenuation of 100 dB/m or more is a crystalline polymer.

* * * * *